United States Patent [19]

Smith

[11] 4,146,341

[45] Mar. 27, 1979

[54] FITTING FOR STRUCTURAL PIPE

[75] Inventor: Lawrence L. Smith, Cincinnati, Ohio

[73] Assignee: The Hollaender Manufacturing Company, Cincinnati, Ohio

[21] Appl. No.: 807,985

[22] Filed: Jun. 20, 1977

[51] Int. Cl.² ............................................. F16B 7/00
[52] U.S. Cl. .................................. 403/174; 403/297; 403/330
[58] Field of Search ............... 403/297, 292, 295, 330, 403/322, 171, 172, 174, 178, 170

[56] References Cited

U.S. PATENT DOCUMENTS

| | | | |
|---|---|---|---|
| 693,159 | 2/1902 | Rumbarger | 403/322 X |
| 1,253,511 | 1/1918 | Moler | 403/330 |
| 3,743,332 | 7/1973 | Sonolet | 403/297 X |
| 3,958,889 | 5/1976 | Berkowitz | 403/297 |

*Primary Examiner*—Andrew V. Kundrat
*Attorney, Agent, or Firm*—Wood, Herron & Evans

[57] ABSTRACT

An unthreaded, slip-on fitting for connecting a length of structural pipe to another length of structural pipe and/or to a stationary structural member such as a floor or wall, which is usable in building scaffolding, shelving, railing and the like. The body of the fitting has extending from it a pair of spaced parallel arms between which a locking element is pivotally mounted on a transverse pin spanning the arms. A set screw which is accessible from the exterior of the fitting body when the arms are inserted into the interior of a pipe to which the fitting is connected, engages a portion of the pivotal locking element extending into a cavity in the fitting body communicating with the slot. When the set screw is advanced inwardly, the locking element is pivoted, moving outwardly in opposite directions a pair of pipe clamping projections on the locking element, to grip the interior of the pipe, thereby securing it to the fitting. When the set screw is retracted, the pipe clamping projections of the pivotal locking element are released and free to move inwardly to unclamp the pipe.

5 Claims, 2 Drawing Figures

U.S. Patent     Mar. 27, 1979     4,146,341
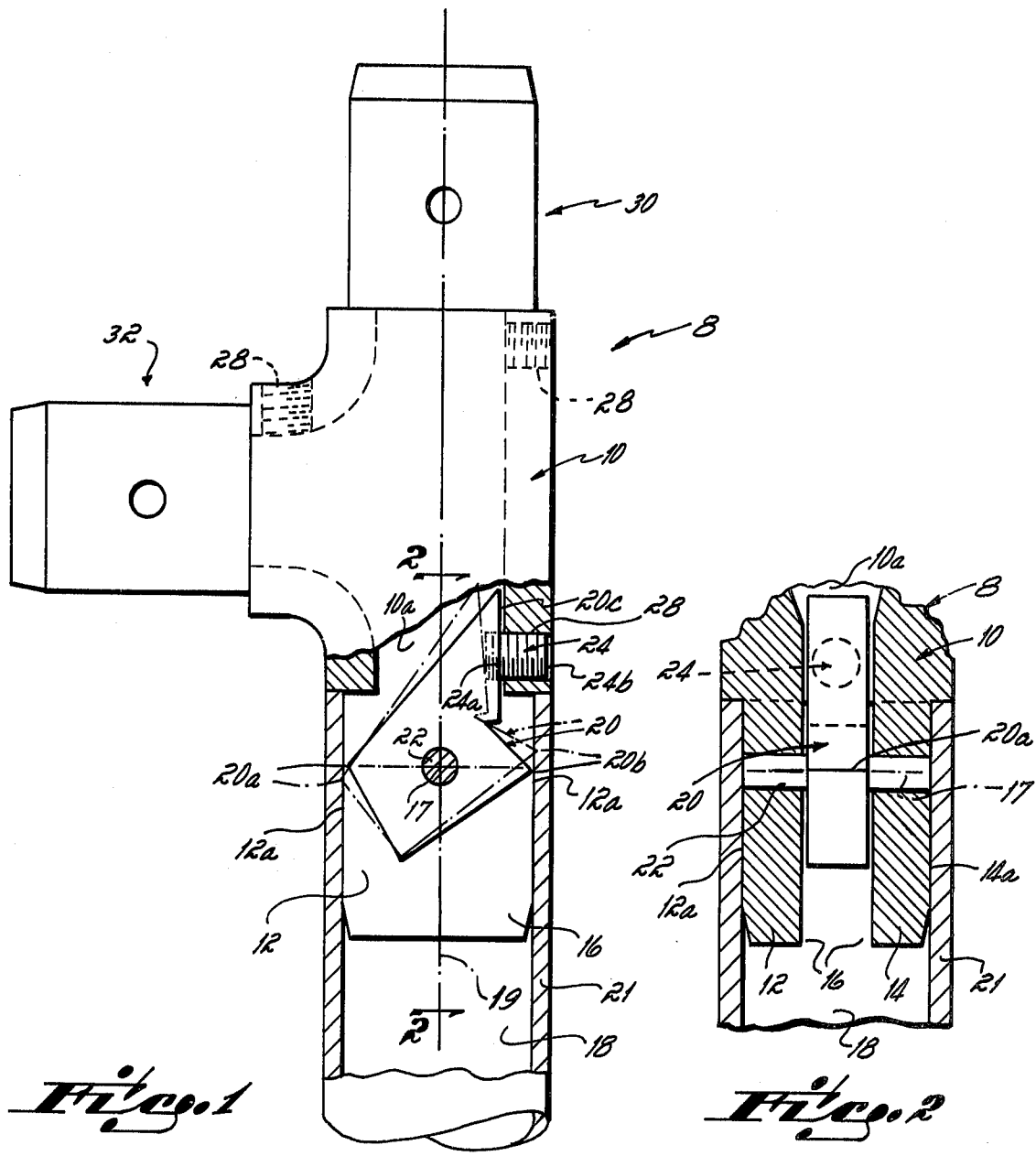

FITTING FOR STRUCTURAL PIPE

This invention relates to unthreaded, slip-on pipe connectors, and more particularly to such pipe connectors which grip the interior of the pipe to thereby conceal the pipe-clamping elements of the fitting.

Unthreaded, or slip-on, fittings for connecting lengths of structural pipe have existed for a number of years. Typically, the slip-on pipe fitting is distinguishable from a conventional pipe fitting in that the former does not require the end of the pipe to be externally threaded, whereas conventional pipe fittings do. Threaded pipe is expensive and time consuming from both the standpoint of the expense needed to provide the threads on the pipe, as well as the time needed to thread the pipe into the fitting to establish a connection. By way of contrast, with slip-on pipe fittings, it is only necessary to insert the unthreaded end of the pipe into an opening in the fitting, and tighten a set screw provided in the wall of the fitting which engages the exterior of the pipe, preventing withdrawal.

With many typical slip-on fittings heretofore known in the art, in which the unthreaded end of the pipe is inserted into an opening in the fitting, it is not possible to have a smooth continuous joint where the exterior surfaces of the pipe and fitting meet. This has detracted from its appearance. While this unattractiveness may not be important in some applications, it is esthetically undesirable for decorative railings, furniture and similar structures where appearance is important. In those prior art fittings designed to overcome the unattractiveness problem, there are other problems, such as, unreliability, excess number of moving parts, and the like, which detract from their desirability.

Accordingly, it has been an objective of this invention to provide an inexpensive, reliable and aesthetically pleasing fitting of the slip-on type for connecting lengths of structural pipe to each other and/or to a structural member, such as, a wall or floor. In a preferred embodiment of the invention, this objective has been accomplished by providing a fitting having a pair of parallel arms extending from the body thereof which collectively have an exterior surface configured to snugly fit within the bore of a structural pipe to which the fitting is to be connected. The arms are spaced apart to form a slot therebetween which communicates with an open recess formed in the fitting body at the base, or inner end, of the arms. A locking element located between the arms and pivotally mounted on a transverse pin spanning the arms has a pair of oppositely directed pipe-clamping projections which, when the locking element pivots, moves in and out of the slot to clamp and unclamp, respectively, a pipe positioned over the fitting arms. To pivot the locking element, a set screw threadedly engaged in a hole in the wall of the fitting is provided. The outer and inner ends of the set screw communicate with the fitting exterior recess formed in the fitting body at the base of the arms, respectively. By advancing and retracting the set screw, the locking element pivots in and out to clamp and unclamp the interior of the pipe which is disposed over the arms of the fitting.

One advantage of the fitting of this invention is that it requires a minimum number of moving parts, namely, a set screw and a pivotal locking element. A further advantage is that, except for the set screw, all elements of the locking assembly are concealed when the fitting and pipe are connected. Hence, its attractiveness from an aesthetic standpoint is enhanced. Finally, since the pipe is clamped at two distinct points on opposite sides of its interior, reliability is improved.

These and other features, objectives and advantages of the invention will become more readily apparent from a detailed description thereof taken in conjunction with the drawings in which:

FIG. 1 is a side elevational view, partially in cross-section, showing a preferred embodiment of the invention, and FIG. 2 is a cross-sectional view taken along line 2—2 of FIG. 1.

The concealed fitting 8 of this invention includes a body 10 from which extend a pair of parallel arms 12 and 14 which are spaced apart to define therebetween a slot 16. The outer peripheral surfaces 12a and 14a of the arms 12 and 14 are configured to snugly fit within the open internal cavity 18 of a structural pipe 21. Typically, the structural pipe 21 has a circular cross-section in which case the peripheral outer surfaces 12a and 14a of the arms 12 and 14 collectively define a cylinder which snugly fits within the inner cylindrical surface of the cavity 18 when the structural pipe is positioned over the arms for connection to the fitting. Were the structural pipe 21 to have a square cross-section the outer peripheral surfaces 12a and 14a of the arms 12 and 14 would preferably be configured to collectively provide the arms with a square cross-section for snugly fitting within the open internal cavity 18 of the pipe. Obviously, other cross-sections can be used.

To releasably secure the structural pipe 21 to the fitting 8 when the arms 12 and 14 are inserted in the pipe cavity 18, a unitary locking element 20 and an actuator 24 are provided. The locking element 20 is positioned between the arms 12 and 14. A transverse pin 22, which passes through coaxial holes formed in the arms 12 and 14 and in the locking element 20, mounts the locking element for pivotal motion on an axis 17 which intersects the arms and passes through the longitudinal axis 19 of the pipe 21 positioned over arms 12 and 14.

The unitary locking element 20 has a pair of oppositely directed pipe clamping projections 20a and 20b which are located on opposite sides of an imaginary plane which contains the pivot axis 17 of the locking element 20 and which is perpendicular to the longitudinal axis 19 of the pipe 21. The pipe clamping projections 20a and 20b are moveable between outer, pipe-clamping positions and inner, pipe-releasing positions, shown in phantom and solid lines, respectively, in FIG. 1, when the unitary locking element pivots in clockwise and counterclockwise directions respectively. In the outer, pipe-clamping position shown in phantom lines in FIG. 1, pipe-clamping projections 20a and 20b are adaped to extend beyond the generally cylindrical surface collectively defined by the outer peripheral surfaces 12a and 14a of arms 12 and 14. In the inner, pipe-releasing position shown in solid lines in FIG. 1, the projections 20a and 20b of the unitary locking element 20 are positioned inwardly of the generally cylindrical surface collectively defined by the outer peripheral surfaces 12a and 14a of arms 12 and 14.

The unitary locking element 20, in addition to pipe clamping projections 20a and 20b, also includes a third surface 20c which projects into a recess 10a formed in the fitting body 10 which communicates with the slot 16 at the inner ends, or base, of arms 12 and 14. The surface 20c of the unitary locking element 20 is moveable between inner and outer positions shown in phantom and solid lines, repsectively, in FIG. 1, which correspond to the pipe-clamping and pipe-releasing positions, respectively, of projections 20a and 20b.

The actuator 24, in a preferred form, is a set screw which is threadedly engaged in a radially disposed through hole 28 formed in the wall of the fitting body 10. The through hole 28 at its inner and outer ends communicates with the body recess 10a and the exterior of the body, respectively. The actuator set screw 24 has an inner end 24a which engages the surface 20c. when the screw 24 is rotated in a locking, or clamping direction, advancing it axially inwardly, the unitary locking element 20 pivots in a counterclockwise direction, in turn moving the pipe clamping projections surfaces 20a and 20b into clamping engagement with the interior wall of the pipe 21. When the set screw is retracted by rotating it about its longitudinal axis in an unclamping direction, the clamping element 20 is free to pivot clockwise, releasing the pipe 21. A screw driver, Allen wrench or the like can be used to rotatably engage the outer end 24b of the set screw actuator 24 to advance and retract it.

The body 10 of the fitting 8 is also provided with means, generally indicated by reference numerals 30 and/or 32, to facilitate connection of the fitting to a structural member independent and apart from the structural pipe 21. The connection-facilitating means 30 and 32 could be one or more assemblies similar to the arms 12 and 14, pivotal unitary locking element 20, and actuator 24 previously described, if the fitting is a tee, elbow or the like. Alternatively, the connection means 30 and/or 32 could take the form of a flange (not shown) which can be bolted to a floor or wall to anchor a length of pipe forming part of a railing, shelf support or the like.

Significantly, with the concealed fitting of this invention, when a pipe 21 is secured to the fitting body 10 the unitary locking element 20 is completely concealed. In fact, when a pipe 21 is secured to the fitting body 10, the only element of the pipe clamping assembly which is not concealed is the actuator 24. Since the actuator 24, in a preferred form, is simply a set screw, that portion of the clamping assembly which is visually exposed, namely, the set screw, is relatively unobtrusive and detracts little from the overall appearance of the fitting.

Additionally, by reason of the fact that the unitary locking element has a surface 20c which extends into the body 10 of the fitting, the set screw 24 can be located in the fitting body at a point such that it is fully accessible when the structural pipe 21 is fitted over arms 12 and 14.

Also important is the fact that the unitary locking element 20 has oppositely directed projections 20a and 20b for applying uniform gripping forces at two distinct and opposite points on the interior of the pipe, enhancing reliability. Preferably, gripping points 20a and 20b, when element 20 is in its gripping position, be on a line through the approximate center 17 of pin 27 generally perpendicular to the axis 19 of pipe 21, thereby minimizing the forces exerted on the pin 22 by the element 20 when the pipe is gripped.

Another important aspect of the pipe connector of this invention is that there are no parts of the pipe-clamping assembly which are likely to be easily disassembled and lost. For example, by press fitting the pin 22 into either the holes in arms 12 and 14, or into the locking element 20, the locking element cannot become disassembled and lost. Similarly, since the actuator 24 is a set screw threadedly engaged in the fitting body 10, which remains threadedly engaged even in the pipe-unclamping positon, the actuator 24 is not likely to become disassembled and lost.

Another important advantage of this invention is the relatively few number of individual parts which are necessary. If the body 10 and arms 12 and 14 are integerally formed, such as in a single casting and the slot 16 is machined the body and arms constitute a single element. The only additional elements are the set screw 24 and the pivotal locking element 20 and its associated mounting pin 22. The locking element, if desired, can be stamped or cut from bar stock. The pin 17 and set screw 24 are readily commercially available off-the-shelf items. Accordingly, the concealed fitting of this invention can be constructed relatively easily from a simple machined casting and readily available bar stock, pins and set screws.

Finally, and an equally important advantage of this invention, is that it is useful in joining standard commercially available structural pipe which need not be threaded internally or externally. Of course, the pipe fitting, as well as the structural pipe, can be disassembled and subsequently resued.

What is claimed is:

1. A concealed fitting for connection to a structural pipe having an open internal cavity at its end, comprising:

a body having means associated therewith to facilitate securing said body to a structural member, said body having a recess therein communicating with the exterior of said body, a pair of parallel arms extending outwardly from said body on opposite sides of said recess, said arms having outer peripheral surfaces configured to collectively snugly fit within said open internal cavity of a structural pipe to which said fitting is to be connected, said arms being spaced from each other to define a slot therebetween connecting with said recess, a unitary locking element located in said slot between said arms, means mounting said locking element for pivotal movement on an axis intersecting said arms, said locking element having first and second oppositely directed pipe-clamping projections moveable between inner and outer positions in which said pipe-clamping projections extend from said slot radially inwardly and outwardly of said outer peripheral arm surfaces, respectively, said locking element having a third surface located within said recess, and an actuator moveable in locking and unlocking directions having an inner end extending into said recess and an outer end accessible exteriorly of said body when said arms are positioned within said open internal cavity of a structural pipe, said actuator inner end engaging said third surface of said locking element for pivoting, when said outer end of said actuator is moved in said locking direction, said locking element first and second projections to their outer positions to clamp a structural pipe in which open internal cavity said arms are fitted, said actuator inner end permitting said locking element first and second projections to move to their inner position to release said structural pipe when said actuator outer end is moved in said unlocking direction.

2. The fitting of claim 1 wherein said outer peripheral surfaces of said arms collectively form a cylinder for snugly engaging the interior cylindrical wall of a structural pipe, and wherein said actuator is a screw having a longitudinal axis, said screw being threaded into a threaded through hole radially disposed in said body at a point accessible from the exterior thereof when said arms are engaged in said open internal cavity of a structural pipe, said locking and unlocking directions being opposite rotational directions relative to the longitudinal axis of said screw.

3. The fitting of claim 2 wherein said locking element is polygonal and said pipe-clamping projections are corners of said polygonal locking element disposed on opposite sides of an imaginary plane which is perpendicular to said arms and contains said pivot axis of said locking element.

4. The fitting of claim 3 wherein said pivotal mounting means includes a pin passing through coaxial apertures formed in said locking element and arms.

5. The fitting of claim 3 wherein said locking element is configured to orient said corners when gripping a structural pipe on an imaginary line which is generally perpendicular to the longitudinal axis of said structural pipe and passes approximately through said pivot axis of said locking element.

* * * * *